US012590890B2

(12) United States Patent
    Lamas De Anda

(10) Patent No.: US 12,590,890 B2
(45) Date of Patent: Mar. 31, 2026

(54) SAMPLE GAS ANALYSIS DEVICE, SAMPLE GAS ANALYSIS METHOD, AND PROGRAM FOR SAMPLE GAS ANALYSIS

(71) Applicant: HORIBA, LTD., Kyoto (JP)

(72) Inventor: Jorge Eduardo Lamas De Anda, Kyoto (JP)

(73) Assignee: HORIBA, LTD. (JP)

( * ) Notice: Subject to any disclaimer, the term of this patent is extended or adjusted under 35 U.S.C. 154(b) by 409 days.

(21) Appl. No.: 17/615,529

(22) PCT Filed: May 25, 2020

(86) PCT No.: PCT/JP2020/020444
    § 371 (c)(1),
    (2) Date: Nov. 30, 2021

(87) PCT Pub. No.: WO2021/005900
    PCT Pub. Date: Jan. 14, 2021

(65) Prior Publication Data
    US 2022/0317033 A1     Oct. 6, 2022

(30) Foreign Application Priority Data
    Jul. 5, 2019    (JP) ................................. 2019-125780

(51) Int. Cl.
    *G01N 21/3504*      (2014.01)
    *G01N 21/31*        (2006.01)
    *G01N 21/35*        (2014.01)

(52) U.S. Cl.
    CPC ....... *G01N 21/3504* (2013.01); *G01N 21/314* (2013.01); *G01N 2021/3595* (2013.01); *G01N 2201/1293* (2013.01)

(58) Field of Classification Search
    CPC ............. G01N 21/3504; G01N 21/314; G01N 33/0059
    See application file for complete search history.

(56) References Cited

U.S. PATENT DOCUMENTS 4,801,209 A      1/1989   Wadlow
6,147,351 A     11/2000   Huiku
           (Continued)

FOREIGN PATENT DOCUMENTS

JP        H03265842 A      11/1991
JP        2000346801 A   * 12/2000    ......... G01N 21/3504
           (Continued)

OTHER PUBLICATIONS

International Search Report dated Aug. 18, 2020 issued for International application No. PCT/JP2020/020444, 4 pgs.
           (Continued)

*Primary Examiner* — Lam S Nguyen
(74) *Attorney, Agent, or Firm* — Brooks Kushman P.C.

(57)                ABSTRACT

Presented is a sample gas analysis device that reduces a measurement error due to a coexistence influence of another measurement target component different from the measurement target component, analyzes a concentration of a plurality of measurement target components in a sample gas by performing multivariate analysis using a spectroscopic spectrum obtained by irradiating the sample gas with light, and includes a library data storage configured to store library data including a plurality of spectrum data corresponding to a plurality of the measurement target components used for the multivariate analysis, and a concentration calculator configured to calculate the concentration of the plurality of measurement target components in the sample gas by the multivariate analysis using the plurality of library data stored in the library data storage.

12 Claims, 6 Drawing Sheets

(56)  References Cited

U.S. PATENT DOCUMENTS

| | | | |
|---|---|---|---|
| 6,894,297 B1 * | 5/2005 | Inoue ................. | G01N 21/3504 |
| | | | 250/493.1 |
| 10,274,422 B2 | 4/2019 | Yokota | |
| 2013/0021612 A1 | 1/2013 | Okada | |
| 2013/0166225 A1 | 6/2013 | Itaya et al. | |
| 2015/0177131 A1 | 6/2015 | Liu et al. | |
| 2015/0260646 A1 | 9/2015 | Hirata et al. | |
| 2016/0132617 A1 | 5/2016 | Liu et al. | |
| 2017/0191929 A1 | 7/2017 | Berman et al. | |
| 2018/0149586 A1 * | 5/2018 | Yokota ............... | G01N 33/0059 |
| 2018/0232500 A1 | 8/2018 | Lascola et al. | |
| 2021/0140877 A1 | 5/2021 | Ando et al. | |

FOREIGN PATENT DOCUMENTS

| | | |
|---|---|---|
| JP | 2014-206541 A | 10/2014 |
| JP | 2018-091827 A | 6/2018 |
| WO | 2019031331 A1 | 2/2019 |

OTHER PUBLICATIONS

EESR dated Jun. 14, 2023 issued in EP patent application No. 20837475.1.
Office Action dated Jan. 9, 2024 issued in JP patent application No. 2021-530516.

* cited by examiner

EXHAUST GAS

100

400

200

V

EP

CAT

E

300

SAMPLE GAS ANALYSIS DEVICE, SAMPLE GAS ANALYSIS METHOD, AND PROGRAM FOR SAMPLE GAS ANALYSIS

CROSS-REFERENCE TO RELATED APPLICATIONS

This application is the U.S. national phase of PCT Application No. PCT/JP2020/020444, filed May 25, 2020, which claims priority to Japanese Patent Application No. 2019-125780, filed Jul. 5, 2019, which are both incorporated by reference herein in their entireties.

TECHNICAL FIELD

The present invention relates to a sample gas analysis device, a sample gas analysis method, and a program for sample gas analysis.

BACKGROUND ART

As a conventional sample gas analysis device, as shown in Patent Literature 1, there is a sample gas analysis device using, for example, a Fourier transform infrared spectroscopy (FTIR) in which a concentration of a measurement target component contained in a sample gas is calculated by multivariate analysis using an absorption spectrum obtained by irradiating the sample gas with light.

The analysis using the FTIR has an advantage that multiple components contained in the sample gas can be continuously and simultaneously analyzed. As another advantageous feature, for example, when used in a field of engine exhaust gas, an exhaust gas as a sample gas can be directly introduced into a sample cell and analyzed, and so-called Wet measurement can be performed in which the concentration of the measurement target component is calculated in a state where the exhaust gas contains moisture.

In the multivariate analysis, library data including a spectrum data group of one or a plurality of measurement target components is used. The spectrum data group includes, in addition to spectrum data of a measurement target component having a known concentration, spectrum data of an interference component that causes an interference influence on the measurement target component. Use of this library data allows concentration measurement in which the interference influence of the interference component on the measurement target component is reduced. The interference influence is an influence caused by overlapping of the spectrum of the measurement target component and the spectrum of another component.

CITATION LIST

Patent Literature

Patent Literature 1: JP 3-265842 A

SUMMARY OF INVENTION

Technical Problem

The inventor has found that there is an event in which the concentration of the measurement target component obtained by the multivariate analysis becomes a value that cannot be taken. The inventor has found that this event is caused by the following factors.

The interference component included in the library data is spectrum data in a case where the interference component exists alone or is diluted with nitrogen or the like. On the other hand, in a measured absorption spectrum obtained by actual measurement, spectrum broadening occurs due to a coexistence influence of a specific measurement target component and a coexistence component (another measurement target component different from the specific measurement target component) and a coexistence influence of the interference components. Therefore, when the measured absorption spectrum in which broadening has occurred is subjected to the multivariate analysis using spectrum data in which broadening has not occurred, the above event occurs. The coexistence influence is different from the interference influence, and is not an overlap of spectra but an influence caused by a deformation in a spectrum due to an intermolecular interaction between a measurement target component and another component.

Therefore, the present invention has been made to solve the above problem, and a main object of the present invention is to reduce a measurement error due to a coexistence influence on a measurement target component.

Solution to Problem

A sample gas analysis device of the present invention analyzes a concentration of a measurement target component in a sample gas by performing multivariate analysis using a spectroscopic spectrum obtained by irradiating the sample gas with light, the sample gas analysis device including a library data storage configured to store library data including a plurality of spectrum data corresponding to a plurality of the measurement target components used for the multivariate analysis, and a concentration calculator configured to calculate the concentration of the measurement target component in the sample gas by the multivariate analysis using the plurality of library data stored in the library data storage, in which the measurement target components include a first measurement target component and a second measurement target component that coexist, and the library data storage stores, as part of the plurality of spectrum data, at least one of coexistence influence spectrum data of the first measurement target component having a spectrum shape changed due to a coexistence influence or coexistence influence spectrum data of the second measurement target component.

This sample gas analysis device stores, as part of the plurality of spectrum data, at least one of the coexistence influence spectrum data of the first measurement target component having a spectrum shape changed due to a coexistence influence because of coexistence of the first measurement target component and the second measurement target component or the coexistence influence spectrum data of the second measurement target component, and the concentration calculator performs multivariate analysis using the plurality of spectrum data. It is therefore possible to reduce a measurement error due to the coexistence influence of the second measurement target component on the first measurement target component.

Here, it is conceivable that the concentration calculator calculates a concentration of the first measurement target component in which a coexistence influence of the second measurement target component is suppressed, by using at least one of the coexistence influence spectrum data of the first measurement target component or the coexistence influence spectrum data of the second measurement target component.

It is also conceivable that the concentration calculator calculates a concentration of the first measurement target component in which an interference influence of the second measurement target component on the first measurement target component is suppressed, by using at least one of the coexistence influence spectrum data of the first measurement target component or the coexistence influence spectrum data of the second measurement target component. It is therefore possible to calculate the concentration of the first measurement target component in which the coexistence influence and the interference influence of the second measurement target component are suppressed, and further reduce the measurement error of the concentration of the first measurement target component.

In order to further reduce the measurement error, it is desirable that the first measurement target component, the second measurement target component, and a third measurement target component coexist, and the library data storage stores, as part of the plurality of spectrum data, the coexistence influence spectrum data of the first measurement target component having a spectrum shape changed due to the coexistence influence, the coexistence influence spectrum data of the second measurement target component, or coexistence influence spectrum data of the third measurement target component.

Here, it is conceivable that the concentration calculator calculates a concentration of the first measurement target component in which an interference influence of at least one of the second measurement target component or the third measurement target component is suppressed, by using at least one of the coexistence influence spectrum data of the first measurement target component, the coexistence influence spectrum data of the second measurement target component, or the coexistence influence spectrum data of the third measurement target component.

It is also conceivable that the concentration calculator calculates a concentration of the first measurement target component in which an interference influence of at least one of the second measurement target component or the third measurement target component is suppressed, by using at least one of the coexistence influence spectrum data of the first measurement target component, the coexistence influence spectrum data of the second measurement target component, or the coexistence influence spectrum data of the third measurement target component. It is therefore possible to calculate the concentration of the first measurement target component in which the coexistence influence and the interference influence of the second measurement target component and/or the third measurement target component are suppressed, and further reduce the measurement error of the concentration of the first measurement target component.

Further, it is desirable that the concentration calculator calculates a concentration of the third measurement target component in which an interference influence of at least one of the first measurement target component or the second measurement target component is suppressed, by using at least one of the coexistence influence spectrum data of the first measurement target component, the coexistence influence spectrum data of the second measurement target component, or the coexistence influence spectrum data of the third measurement target component.

It is conceivable that the second measurement target component is $H_2O$ or $CO_2$.

It is conceivable that the sample gas analysis device quantitatively analyzes one or a plurality of measurement target components in the exhaust gas discharged from an internal combustion engine. In this case, the concentration of $H_2O$ and $CO_2$ contained in the exhaust gas is higher than that of other components, and the coexistence influence on the other components also increases.

It is therefore desirable that one of the second measurement target component or the third measurement target component is $H_2O$ and the other is $CO_2$.

It is desirable to use Fourier transform infrared spectroscopy.

A sample gas analysis method of the present invention analyzes a concentration of a plurality of measurement target components in a sample gas by performing multivariate analysis using a spectroscopic spectrum obtained by irradiating the sample gas with light, the method including calculating the concentration of the plurality of measurement target components in the sample gas by the multivariate analysis by using library data including a plurality of spectrum data corresponding to the plurality of measurement target components used for the multivariate analysis, the plurality of measurement target components including a first measurement target component and a second measurement target component that coexist, and using, as part of the plurality of spectrum data, at least one of coexistence influence spectrum data of the first measurement target component having a spectrum shape changed due to a coexistence influence or coexistence influence spectrum data of the second measurement target component.

A program for sample gas analysis of the present invention analyzes a concentration of a measurement target component in a sample gas by performing multivariate analysis using a spectroscopic spectrum obtained by irradiating the sample gas with light, and instructs a computer to fulfill a function as a library data storage configured to store library data including a plurality of spectrum data corresponding to a plurality of the measurement target components used for the multivariate analysis, and a concentration calculator configured to calculate the concentration of the measurement target component in the sample gas by the multivariate analysis using the plurality of library data stored in the library data storage, in which the measurement target components include a first measurement target component and a second measurement target component that coexist, and the library data storage stores, as part of the plurality of spectrum data, at least one of coexistence influence spectrum data of the first measurement target component having a spectrum shape changed due to a coexistence influence or coexistence influence spectrum data of the second measurement target component.

Advantageous Effects of Invention

The present invention described above can reduce a measurement error due to the coexistence influence on the measurement target component.

REFERENCE SIGNS LIST

100 sample gas analysis device
1 light source
4 photodetector
52 library data storage
53 concentration calculator

DESCRIPTION OF EMBODIMENT

Hereinafter, an exhaust gas analysis device according to an embodiment of the present invention will be described with reference to the drawings.

Figure 1:
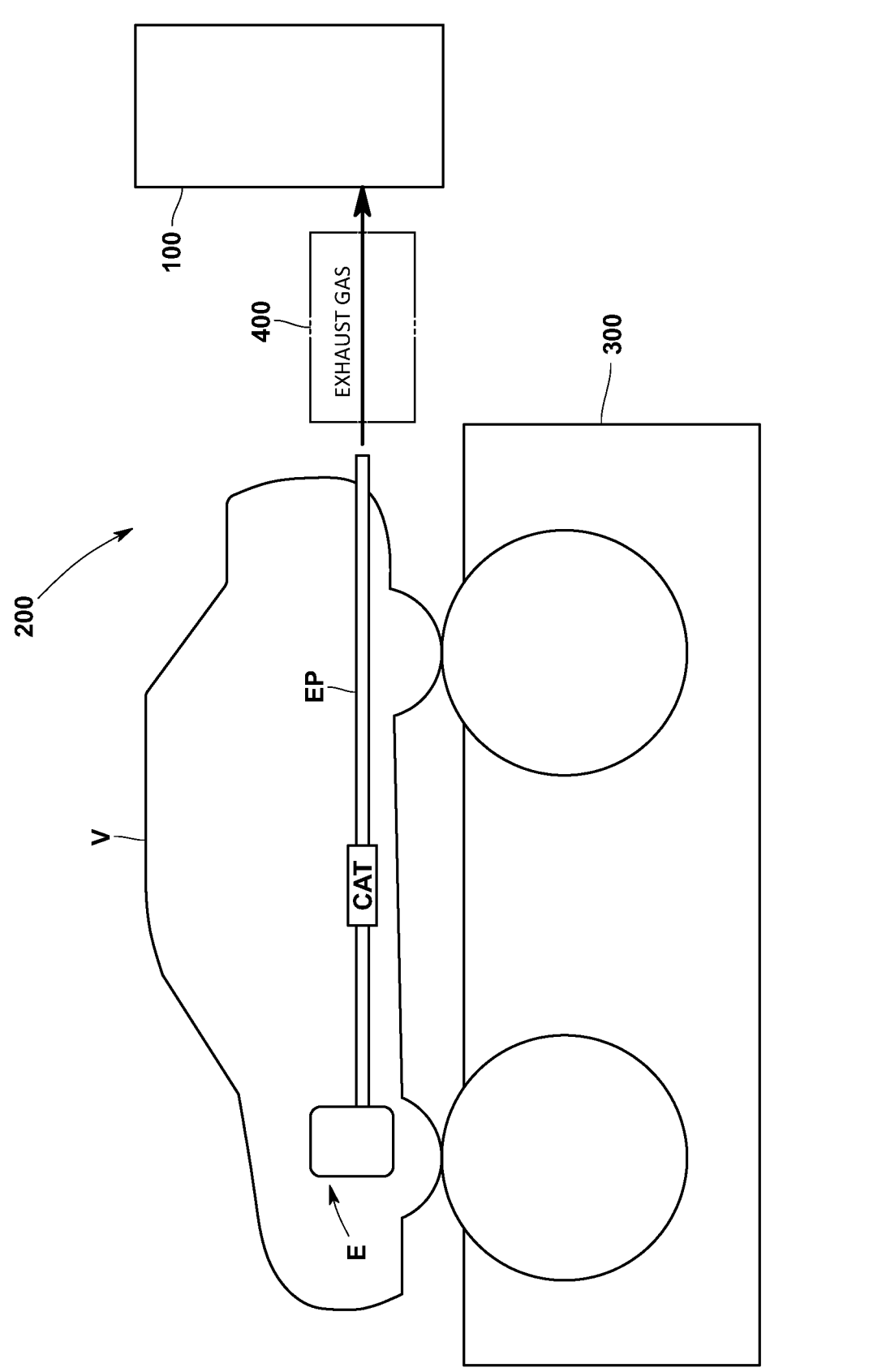
FIG. 1 is an overall schematic diagram of an exhaust gas measurement system according to an embodiment of the present invention.

An exhaust gas analysis device 100 according to the embodiment constitutes, for example, a part of an exhaust gas measurement system 200. As illustrated in FIG. 1, the exhaust gas measurement system 200 includes a chassis dynamometer 300, an exhaust gas sampler 400 such as a constant volume sampler (CVS) that samples an exhaust gas of a test vehicle V as a specimen traveling on the chassis dynamometer 300, and the exhaust gas analysis device 100 that analyzes a measurement target component in the sampled exhaust gas.

Figure 2:
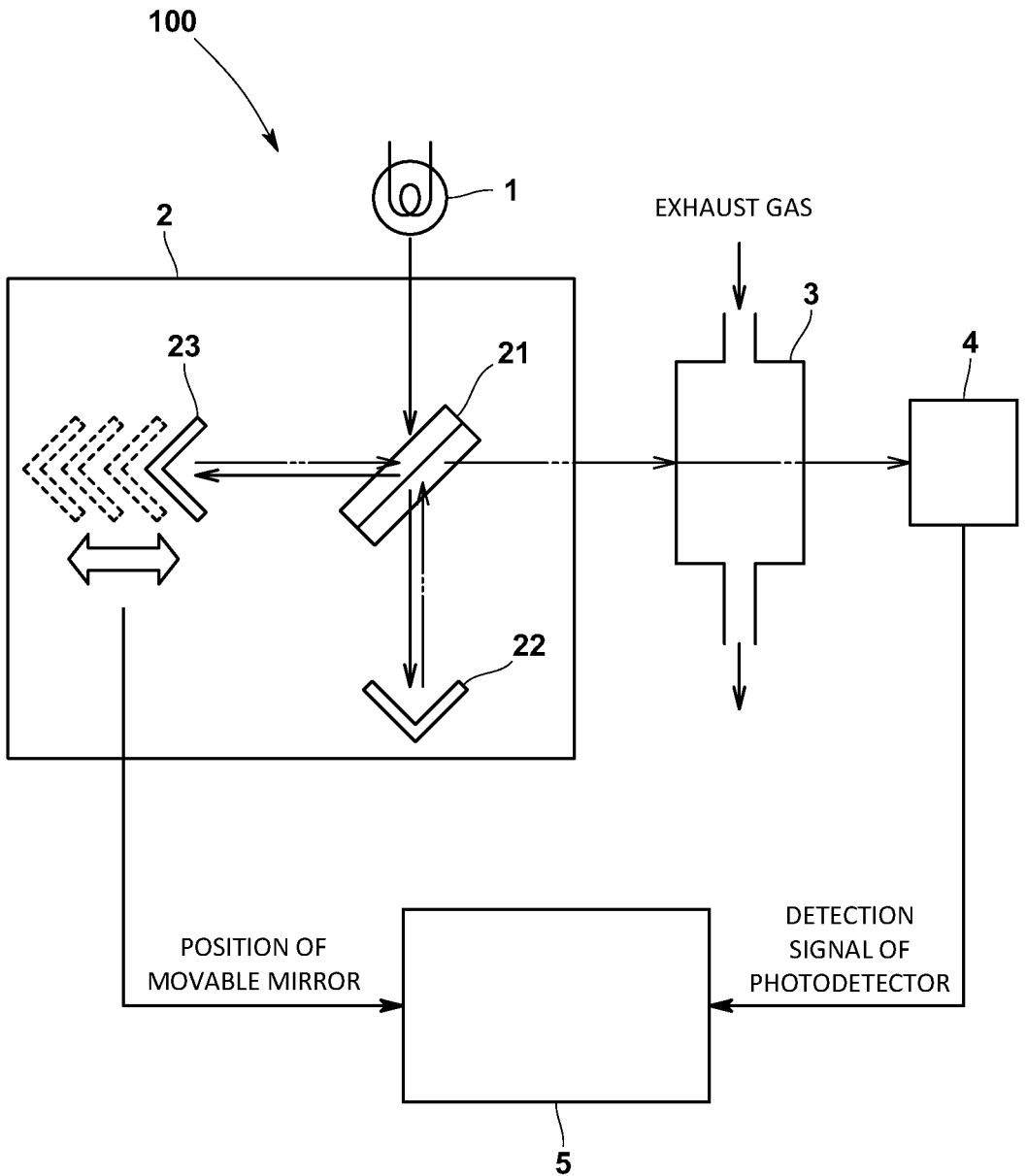
FIG. 2 is a schematic diagram illustrating a configuration of an exhaust gas analysis device according to the embodiment.

Specifically, as illustrated in FIG. 2, the exhaust gas analysis device 100 is an analysis device using Fourier transform infrared spectroscopy (FTIR), including a light source 1, an interferometer (spectroscopic unit) 2, a measurement cell 3, a photodetector 4, an arithmetic processor 5, and the like.

The light source 1 emits infrared light having a broad spectrum (continuous light including light having multiple wavenumbers), and for example, a tungsten-iodine lamp or a high-luminance ceramic light source is used.

As illustrated in the drawing, the interferometer 2 uses a so-called Michelson interferometer including one half mirror (beam splitter) 21, a fixed mirror 22, and a movable mirror 23. The infrared light from the light source 1 incident on the interferometer 2 is divided into reflected light and transmitted light by the half mirror 21. One of the lights is reflected by the fixed mirror 22, the other light is reflected by the movable mirror 23, and the lights return to the half mirror 21 and are combined, and combined light is emitted from the interferometer 2.

The measurement cell 3 is a transparent cell into which the sampled exhaust gas is introduced, and the light emitted from the interferometer 2 is transmitted through the exhaust gas in the measurement cell 3 and guided to the photodetector 4.

The photodetector 4 detects the infrared light transmitted through the exhaust gas and outputs a detection signal (light intensity signal) to the arithmetic processor 5. The photodetector 4 according to the embodiment is an MCT (HgCdTe) detector, but may be a photodetector having other infrared detection elements.

The arithmetic processor 5 includes an analog electric circuit including a buffer, an amplifier, and the like, a digital electric circuit including a CPU, a memory, a DSP, and the like, and an A/D converter and the like interposed between the analog electric circuit and the digital electric circuit.

Figure 3:
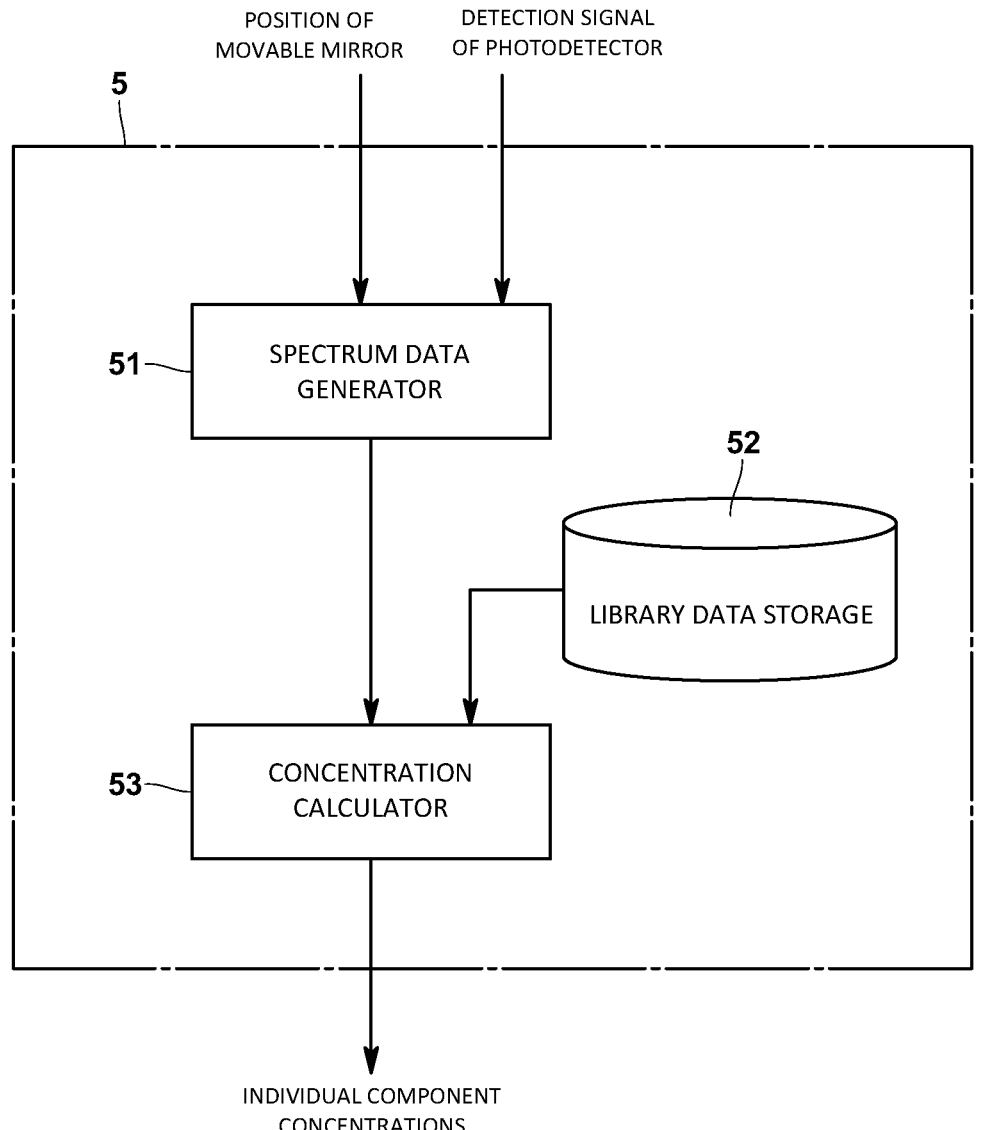
FIG. 3 is a functional block diagram of an arithmetic processor according to the embodiment.

By the CPU and its peripheral devices cooperating in accordance with a predetermined program stored in the memory, as illustrated in FIG. 3, the arithmetic processor 5 exhibits a function of calculating the transmitted light spectrum data indicating a spectrum of light transmitted through a sample from the detection signal of the photodetector 4, calculating infrared absorption spectrum data from the transmitted light spectrum data, identifying various components in the exhaust gas, and calculating component concentrations of the various components.

Specifically, the arithmetic processor 5 includes a spectrum data generator 51, a library data storage 52, and a concentration calculator 53.

When the movable mirror 23 is moved forward and backward and the light intensity of light transmitted through the exhaust gas is observed with a position of the movable mirror 23 as a horizontal axis, the light intensity of light with a single wavenumber draws a sine curve by interference. However, since the actual light transmitted through the exhaust gas is continuous light and the sine curve differs for each wavenumber, the actual light intensity is superposition of the sine curves drawn by the respective wavenumbers, and an interference pattern (interferogram) has a form of a wave bundle.

The spectrum data generator 51 obtains the position of the movable mirror 23 by using a range finder (not illustrated) such as a HeNe laser (not illustrated), obtains the light intensity at each position of the movable mirror 23 by using the photodetector 4, and performs fast Fourier transform (FFT) on the interference pattern obtained from the light intensity, and converts the interference pattern into transmitted light spectrum data with each wavenumber component as the horizontal axis. Then, for example, the transmitted light spectrum data of the exhaust gas is further converted into the infrared absorption spectrum data on the basis of the transmitted light spectrum data measured in advance in a state where the measurement cell is empty.

The library data storage 52 stores library data, calibration curve data, and the like including a known spectrum data group for each of a plurality of measurement target components (for example, $CO$, $CO_2$, $NO$, $H_2O$, $NO_2$, $C_2H_5OH$, $HCHO$, $CH_4$, or the like) used for multivariate analysis.

As part of the spectrum data group for each measurement target component, the library data storage 52 according to the embodiment stores coexistence influence spectrum data in which two or more measurement target components coexist, and thus a spectrum shape of one measurement target component is changed due to a coexistence influence from the other measurement target components. For example, as part of a spectrum data group of a specific measurement target component (equivalent to "first measurement target component" in the claims), the library data storage 52 stores a coexistence influence spectrum data influenced by a coexistence influence of other measurement target components different from the specific measurement target component (equivalent to "second measurement target component and third measurement target component" in the claims and also referred to as interference component). In addition, as part of the spectrum data group of the specific measurement target component, the library data storage 52 stores spectrum data (hereinafter, interference component coexistence spectrum) of a gas in which two or more interference components coexist and the specific measurement target component is not included. Here, examples of the two or more interference components other than the measurement target component include $H_2O$ and $CO_2$ having a higher concentration than other interference components and having a larger coexistence influence on other components.

Figure 4:
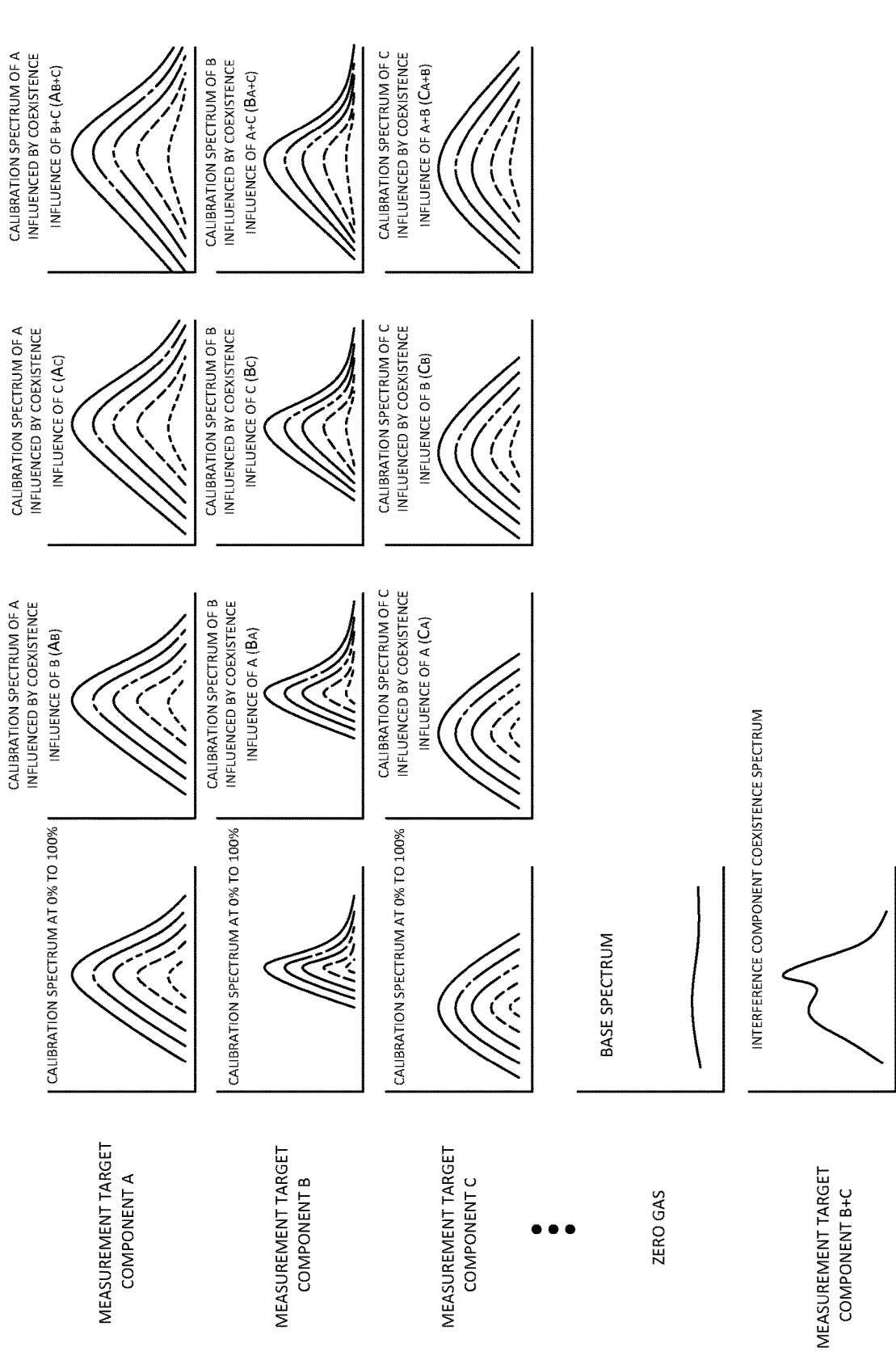
FIG. 4 is a schematic diagram of library data according to the embodiment.

For example, as illustrated in FIG. 4, the spectrum data group includes (1) calibration spectra (A to C) having known concentrations (for example, every 10% at 0% to 100%) of measurement target components A to C alone, (2) a spectrum of zero gas (base spectrum), (3) when the measurement target components A to C having known concentrations coexist with one or more interference components having known concentrations, coexistence influence spectra ($A_B$, $A_C$, $A_{B+C}$, $B_A$, $B_C$, $B_{A+C}$, $C_A$, $C_B$, $C_{A+B}$, or the like) of each measurement target component having spectrum shape changed due to the coexistence influence of each measurement target component, and (4) interference component coexistence spectra (A+B, B+C, A+C, A+B+C, or the like) when a plurality of interference components having known concentrations coexist.

Figure 5:
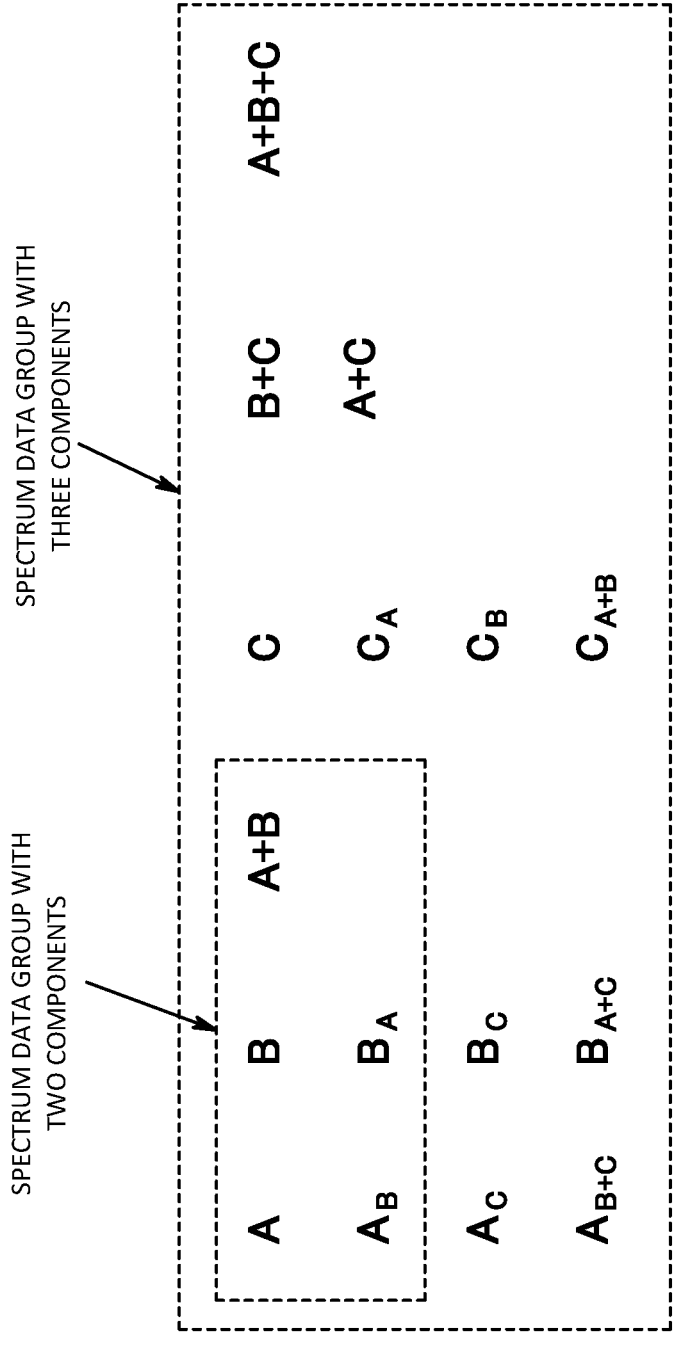
FIG. 5 is a schematic diagram illustrating a pattern of library data of two components or three components according to the embodiment.

FIG. 5 illustrates a spectrum pattern (spectrum data group) when there are two measurement target components and a spectrum pattern (spectrum data group) when there are three measurement target components. Note that the patterns illustrated in FIG. 5 are examples, and it is not necessary to have all these spectra.

Specifically, (3) the coexistence influence spectra include, for example, a coexistence influence spectrum of CO in which a measurement target component (for example, CO) having a known concentration has a spectrum shape changed due to a coexistence influence of $CO_2$ having a known concentration, a coexistence influence spectrum of a measurement target component (for example, CO) having a known concentration and CO having a spectral shape changed due to a coexistence influence of $CO_2$ having a known concentration and $H_2O$ having a known concentration, and the like.

(4) The interference component coexistence spectra include, for example, (a) a spectrum of a gas in which 12% $CO_2$ and 12% $H_2O$ coexist, (b) a spectrum of a gas in which 12% $CO_2$ and 15% $H_2O$ coexist, (c) a spectrum of a gas in which 15% $CO_2$ and 12% $H_2O$ coexist, and (d) a spectrum of a gas in which 15% $CO_2$ and 15% $H_2O$ coexist.

As described above, the spectrum data group includes a plurality of coexistence influence spectra including a combination of a plurality of concentrations of each measurement target component and a plurality of concentrations of each interference component, and a plurality of interference component coexistence spectra including a combination of a plurality of concentrations of each interference component. The coexistence influence spectra and the interference component coexistence spectra are spectra for correcting the coexistence influence in measured absorption spectrum.

From the infrared absorption spectrum data obtained by the spectrum data generator 51 and the library data stored in the library data storage, the concentration calculator 53 identifies various components (for example, CO, $CO_2$, NO, $H_2O$, $NO_2$, or the like) contained in a measurement sample from each peak position (wavenumber) of the infrared absorption spectrum data and its height by multivariate analysis, and calculates the concentration of each component. Here, since the coexistence influence spectra and the interference component coexistence spectra are used, the concentration calculator 53 calculates the concentration of the measurement target component by correcting the coexistence influence of the interference component with respect to the measurement target component and the coexistence influence of the interference components.

Figure 6:
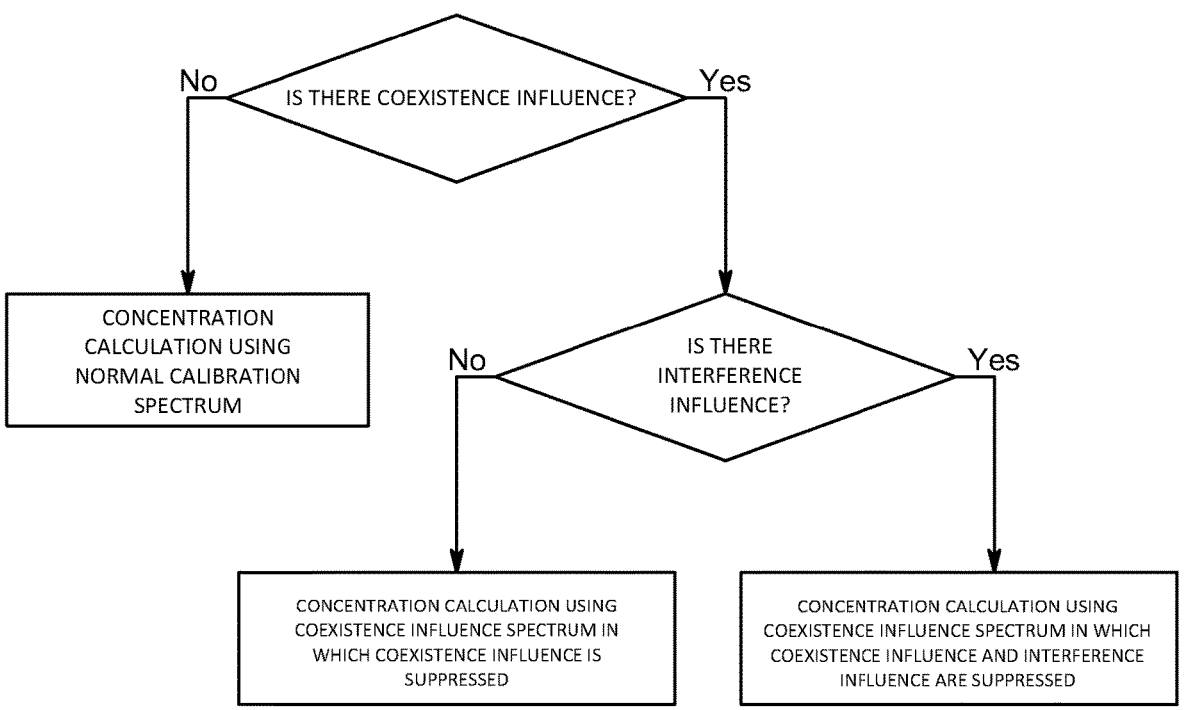
FIG. 6 is a schematic diagram illustrating concentration calculation of a concentration calculator according to the embodiment.

FIG. 6 schematically illustrates concentration calculation of the concentration calculator 53. When the plurality of measurement target components have no coexistence influence, the concentration calculator 53 calculates the concentration using normal calibration spectra (A to C and the like). On the other hand, when at least one of the plurality of measurement target components has a coexistence influence, the concentration is calculated using a coexistence influence spectrum (and an interference component coexistence spectrum, if necessary). Here, when at least one of the plurality of measurement target components has an interference influence, the concentration in which the coexistence influence and the interference influence are suppressed is calculated using the coexistence influence spectrum. A user can select the calibration spectrum to be used from the library data.

<Effects of Embodiment>

In the sample gas analysis device 100 according to the embodiment configured as described above, there is stored coexistence influence spectrum data in which two or more measurement target components coexist, and thus a spectrum shape of one measurement target component is changed due to a coexistence influence from the other measurement target components, and the concentration calculator performs multivariate analysis using the coexistence influence spectrum. It is therefore possible to reduce a measurement error due to the coexistence influence on the measurement target components.

<Other Modified Embodiments>

Note that the present invention is not limited to the above embodiment.

For example, in the embodiment, the coexistence influence spectrum of $H_2O$ or $CO_2$ and the interference component coexistence spectrum of $H_2O$ and $CO_2$ are used in order to correct the coexistence influence when $H_2O$ and $CO_2$ having a relatively higher concentration than other components coexist. Alternatively, the coexistence influence spectrum or the interference component coexistence spectrum when other components (for example, CO, $CH_4$, or the like) coexist may be used, or the coexistence influence spectrum or the interference component coexistence spectrum when three or more types of interference components coexist may be used. In order to increase accuracy most, it is conceivable that the spectrum data storage stores spectrum data of combinations of all interference components and combinations of all measurement target components and interference components.

In the embodiment, the sample gas analysis device using the FTIR for automobile exhaust gas has been described. However, the sample gas analysis device can also be used for analysis of various combustion exhaust gases such as exhaust gases from ships, aircrafts, and generators. Further, the present invention is not limited to a fuel exhaust gas, and can be used for analysis of various sample gases such as analysis of a sample gas using FTIR for a methanol reforming system for a fuel battery and analysis of a gas generated from a battery. The present invention can be used for an analysis device in which a measurement component has an interference influence due to an interference component such as an analysis device using ICP emission spectrometry or an analysis device using Raman spectroscopy.

In addition, the sample gas analysis device of the present invention is not limited to using the FTIR, and may quantitatively analyze multiple components contained in the sample gas using, for example, a non-dispersive infrared absorption (NDIR) method, a quantum cascade laser infrared (QCL-IR) spectroscopy, a non-dispersive ultraviolet absorption (NDUV) method, an ultraviolet (UVA) spectroscopy, or the like.

Further, the exhaust gas measurement system 200 according to the embodiment tests the completed vehicle V using the chassis dynamometer. Alternatively, the exhaust gas measurement system 200 may test, for example, performance of an engine using an engine dynamometer, or may test performance of a power train using a dynamometer.

In addition, various modifications or combinations of the embodiments may be made without departing from the gist of the present invention.

INDUSTRIAL APPLICABILITY

The present invention can reduce a measurement error due to a coexistence influence of another measurement target component different from the measurement target component.

The invention claimed is:

1. A sample gas analysis device using Fourier transform infrared spectroscopy configured to analyze a concentration of a measurement target component in a sample gas by performing multivariate analysis using infrared absorption spectrum data obtained by irradiating the sample gas with light, the sample gas analysis device comprising:

a library data storage configured to store library data including a plurality of spectrum data corresponding to a plurality of the measurement target components used for the multivariate analysis; and a concentration calculator configured to calculate the concentration of the measurement target component in the sample gas by the multivariate analysis using the library data stored in the library data storage, wherein the sample gas includes a first component that is a measurement target component and a second component that is an interference component that coexist with the first component, and the library data storage stores, as part of the plurality of spectrum data, at least one of coexistence influence spectrum data of the first component having a spectrum shape changed due to a coexistence influence of the second component or coexistence influence spectrum data of the second component having a spectrum shape changed due to a coexistence influence of the first component, wherein the concentration calculator calculates the concentration of the first component from each peak position of the infrared absorption spectrum data and a corresponding height by multivariate analysis using at least one of the coexistence influence spectrum data of the first component or the coexistence influence spectrum data of the second component, and in the coexistence influence spectrum data of the first component and the coexistence influence spectrum data of the second component, concentrations of the first component and the second component are known, respectively.

2. The sample gas analysis device according to claim 1, wherein the concentration calculator calculates a concentration of the first component in which the coexistence influence of the second component is suppressed, by using at least one of the coexistence influence spectrum data of the first component or the coexistence influence spectrum data of the second component.

3. The sample gas analysis device according to claim 1, wherein the concentration calculator calculates a concentration of the first component in which an interference influence of the second component on the first component is suppressed, by using at least one of the coexistence influence spectrum data of the first component or the coexistence influence spectrum data of the second component.

4. The sample gas analysis device according to claim 1, wherein the first component, the second component, and a third component coexist, and the library data storage stores, as part of the plurality of spectrum data, at least one of the coexistence influence spectrum data of the first component having a spectrum shape changed due to the coexistence influence of the second component and/or the third component, the coexistence influence spectrum data of the second component having a spectrum shape changed due to the coexistence influence of the first component and/or the third component, or coexistence influence spectrum data of the third component having a spectrum shape changed due to the coexistence influence of the first component and/or the second component.

5. The sample gas analysis device according to claim 4, wherein the concentration calculator calculates a concentration of the first component in which the coexistence influence of at least one of the second component or the third component is suppressed, by using at least one of the coexistence influence spectrum data of the first component, the coexistence influence spectrum data of the second component, or the coexistence influence spectrum data of the third component.

6. The sample gas analysis device according to claim 4, wherein the concentration calculator calculates a concentration of the first component in which an interference influence of at least one of the second component or the third component is suppressed, by using at least one of the coexistence influence spectrum data of the first component, the coexistence influence spectrum data of the second component, or the coexistence influence spectrum data of the third component.

7. The sample gas analysis device according to claim 4, wherein the concentration calculator calculates a concentration of the third component in which an interference influence of at least one of the first component or the second component is suppressed, by using at least one of the coexistence influence spectrum data of the first component, the coexistence influence spectrum data of the second component, or the coexistence influence spectrum data of the third component.

8. The sample gas analysis device according to claim 1, wherein the second component is $H_2O$ or $CO_2$.

9. The sample gas analysis device according to claim 4, wherein one of the second component or the third component is $H_2O$, and another one of the second component or the third component is $CO_2$.

10. The sample gas analysis device according to claims 1, wherein the sample gas is exhaust gas discharged from an internal combustion engine.

11. A sample gas analysis method using Fourier transform infrared spectroscopy, analyzing a concentration of a measurement target component in a sample gas by performing multivariate analysis using infrared absorption spectrum data obtained by irradiating the sample gas with light, the method comprising:

calculating the concentration of the measurement target component in the sample gas by the multivariate analysis using library data including a plurality of spectrum data corresponding to a plurality of the measurement target components used for the multivariate analysis, wherein the sample gas includes a first component that is a measurement target component and a second component that is an interference component that coexists with the first component; and calculating the concentration of the first component from each peak position of the infrared absorption spectrum data and a corresponding height by multivariate analysis using, the infrared absorption spectrum data as part of the plurality of spectrum data, at least one of coexistence influence spectrum data of the first component having a spectrum shape changed due to a coexistence influence of the second component or coexistence influence spectrum data of the second component having a spectrum shape changed due to a coexistence influence of the first component, and in the coexistence influence spectrum data of the first component and the coexistence influence spectrum data of the second component, concentrations of the first component and the second component are known, respectively.

12. A non-transitory computer readable storage medium storing instructions of a program for sample gas analysis using Fourier transform infrared spectroscopy, the program being configured to analyze a concentration of a measurement target component in a sample gas by performing multivariate analysis using infrared absorption spectrum data obtained by irradiating the sample gas with light, the instructions, when executed by a computer, cause the computer to fulfill a function as:

a library data storage configured to store library data including a plurality of spectrum data corresponding to a plurality of the measurement target components used for the multivariate analysis; and a concentration calculator configured to calculate the concentration of the measurement target component in the sample gas by the multivariate analysis using the library data stored in the library data storage, wherein the sample gas includes a first component that is a measurement target component and a second component that is an interference component that coexists with the first component, the library data storage stores, as part of the plurality of spectrum data, at least one of coexistence influence spectrum data of the first component having a spectrum shape changed due to a coexistence influence of the second component or coexistence influence spectrum data of the second component having a spectrum shape changed due to a coexistence influence of the first component, and the concentration calculator calculates the concentration of the first component from each peak position of the infrared absorption spectrum data and a corresponding height by multivariate analysis using at least one of the coexistence influence spectrum data of the first component or the coexistence influence spectrum data of the second component, and in the coexistence influence spectrum data of the first component and the coexistence influence spectrum data of the second component, concentrations of the first component and the second component are known, respectively.

* * * * *